US 6,694,434 B1

(12) United States Patent
McGee et al.

(10) Patent No.: US 6,694,434 B1
(45) Date of Patent: Feb. 17, 2004

(54) METHOD AND APPARATUS FOR CONTROLLING PROGRAM EXECUTION AND PROGRAM DISTRIBUTION

(75) Inventors: William G. McGee, Ottawa (CA); Glenn C. Langford, Kanata (CA); Paul C. Van Oorschot, Ottawa (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/220,246

(22) Filed: Dec. 23, 1998

(51) Int. Cl.[7] ............................. G06F 12/14; H04L 9/00
(52) U.S. Cl. ........................................ 713/189; 713/182
(58) Field of Search ............................. 713/189, 151, 713/152, 155, 156, 168, 175, 200, 201, 182

(56) References Cited

U.S. PATENT DOCUMENTS

| 5,412,717 A | * | 5/1995 | Fischer ..................... 713/156 |
| 5,638,446 A | | 6/1997 | Rubin |
| 5,825,877 A | * | 10/1998 | Dan et al. .................... 705/54 |
| 5,892,904 A | | 4/1999 | Atkinson et al. |
| 5,919,257 A | * | 7/1999 | Trostle ........................ 713/200 |
| 5,944,821 A | * | 8/1999 | Angelo ........................ 713/200 |
| 6,256,393 B1 | * | 7/2001 | Safadi et al. ................ 380/211 |

* cited by examiner

Primary Examiner—Matthew Smithers
(74) Attorney, Agent, or Firm—Vedder, Price, Kaufman & Kammholz, P.C.

(57) ABSTRACT

A system and method for controlling program execution for a first-party includes providing application registration data, by a second-party (trusted party), wherein the application registration data contains a plurality of first unique application verification data (i.e., data elements), such as a list of hash values. Each unique application verification data element corresponds to at least one of the plurality of approved executable programs. The unique application verification data element is determined as a uniquely associatable data corresponding to each of corresponding executable programs from the plurality of executable programs. Prior to allowing individual program execution by the first-party, the first-party generates a second unique application verification data element, such as a hash value, of an executable file designated for execution on a processing device and compares the generated hash value to the list of hash values. If a match is found, the program is allowed to execute.

35 Claims, 7 Drawing Sheets

METHOD AND APPARATUS FOR CONTROLLING PROGRAM EXECUTION AND PROGRAM DISTRIBUTION

RELATED CO-PENDING APPLICATION

This is a related application to co-pending application entitled "Method And Apparatus For Controlling Application Access To Limited Access Based Data", filed on even date, having U.S. Ser. No. 09/220,247 and having inventors Glenn Langford and Ronald Vandergeest, and owned by instant assignee.

FIELD OF THE INVENTION

The invention relates generally to systems that employ information security algorithms, and more particularly to systems and methods for controlling software application operation and secure software distribution.

BACKGROUND OF THE INVENTION

Many of today's computer systems and communication systems employ some type of information security system such as a public key cryptography system or other cryptographic based security system to either encrypt information communicated among applications or to other units within the system, or to digitally sign documents as a method of electronic commerce or for other suitable purpose. Information security systems are often used by multiple software applications, for example, an e-mail application may use public/private key cryptographic programs to allow the encryption of electronic mail or digital signing of electronic mail. Similarly, other software applications such as financial transaction applications that allow a user to digitally sign, for example, electronic contracts or purchase orders to carry out financial transactions, may also use the same public public/private key infrastructure as the e-mail application and other applications within the system. In a public/private key based cryptography system as known in the art, a private signing key and a private decryption key may be stored in an encrypted secret file in each computer corresponding to a user of the computer. The user typically has to login on the computer to gain access to the secret key information by entering a specific password, or through another mechanism, each time the security system needs to be used. As such, when multiple applications are being used by a user, a login requirement on a per application basis for use of the security system becomes cumbersome, although it can provide a high level of security from unauthorized access.

In other known computer systems using information security systems, a single login by the user can be used wherein subsequent applications are allowed access to the secret key information stored in the file. When a login or use is requested by a different application, the application retrieves the stored login information and obtains it automatically. A problem arises with such systems when unauthorized applications (for example rogue software applications, applications not authorized by an individual or corporation, or unlicensed applications) may be attempting access to a computer either in a foreground or background mode. Since the system allows access by any application seeking use of the cryptographic system, protected credentials such as secret decryption keys and signing keys can be obtained without the user's knowledge. As a result, an unauthorized party may use a rogue application to obtain a secret signing key to digitally forge documents or decrypt important documents that were originally encrypted only for receipt by a specific user. The rogue application can attempt and obtain access, by being downloaded, for example, from a worldwide computer network.

In an attempt to overcome such problems, a code-signing scheme has been developed to help ensure that a specific software application is a legitimate application. For example, when a manufacturer releases a new software application, or new version of a previously released application, over a public network, the manufacturer digitally signs the software application with a signature that is trusted by the receiving unit in the network through the use of, for example, certificate authorities, as known in the art. As such, a computer node or other communication unit may determine that the application is not a virus or a rogue software application. Code signing schemes generally involve an executable file being digitally signed by a trusted authority and the signature is verified by a computer unit before the program is run. However typically in such schemes, all of the trust is in the manufacturer or the entity signing the application, and typically the signature certificate of the code signer accompanies the signed code. Furthermore, the granularity of control is generally coarse. For example, either all programs by a given code signer are automatically trusted or none are, and in the latter case a user may be prompted to approve individual programs; however the capability does not exist to centrally control the designation of only selected programs from a given code signer to be automatically trusted.

Other computer systems are known that have mechanisms that allow a user to grant or deny specific applications access to peripheral devices such as hard disks and to limit access to networks. However, such systems do not typically provide continuing protection that only authorized applications are run by carrying out a check each time an application is opened.

Also, it would be desirable to control whether a calling application can execute on a processor, since unauthorized applications can be inadvertently downloaded onto a system or an updated version of software can be released that should be run instead of an older and perhaps malfunctioning version of an application.

It would also be desirable to provide a suitable software distribution mechanism that substantially reduced the likelihood that an unauthorized application would be allowed to execute for a particular processing unit. For example, a problem can arise with operating systems that run executable files that may be corrupted, contain a virus, not be properly licensed, or otherwise be detrimental to the system. Computer virus checking systems are known that store lists of identified strings or portions of known virus. The virus checking software typically analyzes the executable code to determine whether predefined strings are embodied in the program. However, such systems typically do not generate and store a list of pre-approved hash values of executable programs and compare a program to be run with the predefined list of hash values. Moreover, such systems typically do not indicate which files may be approved for executability, but typically indicate which programs or files are improper for execution due to a found virus based on a predetermined data string.

Other systems are known for the secure distribution of electronic files, such as the system described in U.S. Pat. No. 5,638,446, issued Jun. 10, 1997, entitled "Method For The Secure Distribution Of Electronic Files In A Distributed Environment". This system discloses a process for using a trusted third-party to create an electronic certificate for an electronic file that is used to establish the integrity of the file and verify the identity of the creator of the file. To register the file with a trusted third-party, the third-party receives information about an author, such as an author's public key, and verifies the accuracy of the public key. In the file distribution phase, an author sends to the trusted third-party a signed message containing the hash of the file the author wants to distribute. The trusted third-party creates an electronic certificate signed by the third-party, containing the hash of the file sent by the author. The user desiring to receive the file retrieves the file with the certificate. The user then uses the certificate to verify first, that the certificate was created by the third-party, and second, that the hash of the file and the certificate is the same as the hash as computed from the retrieved file. If the two hashes match, the user then believes that the file came from the author and is uncorrupted.

However, such a system does not generally evaluate on a continuous basis whether a calling executable program may be suitable for executability on a system, nor does such a system typically provide a list of approved hash values which may be centrally distributed to a plurality of receiving units to facilitate central distribution of approved executable files and control of multiple executable applications to a plurality of recipients.

Consequently, there exists a need for a system and method for controlling program execution for a first-party based on a plurality of approved hash values of executable file data. It would be desirable if such a system facilitated centralized distribution and control of program execution for a plurality of units.

DETAILED DESCRIPTION OF THE PREFERRED EMBODIMENT

Figure 1:
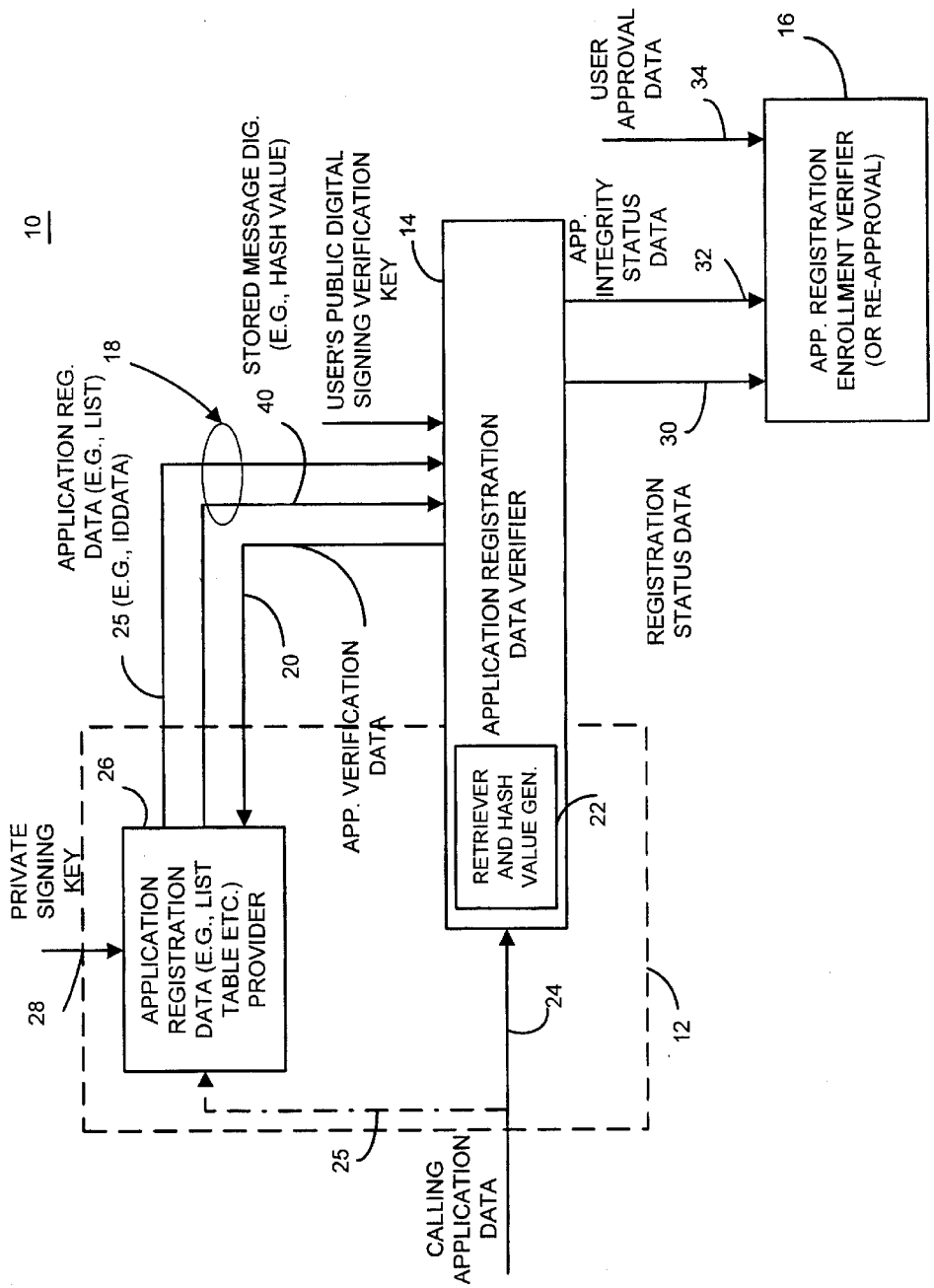
FIG. 1 is a block diagram illustrating one embodiment of an apparatus for controlling application execution privileges in accordance with the invention.

A system and method for controlling program execution for a first-party includes providing application registration data, by a second-party, wherein the application registration data contains a plurality of first unique application verification data (i.e., data elements), such as a list of hash values. Each unique application verification data element corresponds to at least one of the plurality of authorized (approved) executable programs. The authorization may be for the program in general, or further qualified for example authorization on a per-user, user account, or per-computing device basis. The unique application verification data element is determined as uniquely associatable data such as data that is based on or is a function of executable file data corresponding to each of corresponding executable programs from the plurality of executable programs. In this way, an approved stored list of hash values for approved executable files for programs, for example, is generated by a trusted party. Prior to allowing individual program execution by the first-party, the first-party generates or retrieves a second unique application verification data element, such as a hash value, of an executable file designated for execution on a processing device, such as a computer or the communication unit.

The system and method allows control of which programs are granted execution privileges. In one preferred embodiment, execution privileges consist simply of the right to execute on a given processor. In alternate embodiments, execution privileges may be defined by detailed privilege vector data. The stored hash values from the list are evaluated and compared to the generated hash value. The first-party system grants program executability on a per-program basis based on the comparison of the pre-stored hash values and hash value generated by the party having the program designated for execution. As used herein, parties may refer to any suitable processor. The second-party may be a central distribution server, for example, that may distribute the hash list to a plurality of receiving processors, such as other nodes in the network.

For integrity purposes, the application registration data may optionally be digitally signed by, for example, a user's own private signing key, or its integrity may be protected by other suitable mechanisms, for example by a message authentication code (MAC).

An application registration data generator, on a per application basis, generates application registration data that contains at least application identification data, such as, the name of a software application or a pathname to a software application, and stored unique application verification data. For example, the unique application verification data may be generated from a one-way hash function applied to an executable file, or part thereof. The verification data may also be generated by non-cryptographic means, such as a checksum or cyclic-redundancy check. In alternate cases, the application identification data may consist of the application verification data itself. In yet other cases, the application verification data consists of data which with reasonable probability uniquely identifies an executable file. For example this may be information such as its file size, file location, time of creation, or information provided in an operating system resource block such as an application name or resource version number. While this variation provides less security against malicious concerns such as rogue applications, it may nonetheless address concerns related to other classes of unauthorized applications such as ensuring that only licensed programs are allowed to execute.

Executable file data may be object code executable by a processing unit or by a software application, scripted code or other code interpretable by a software application, or any other suitable code that influences the behavior of a processing device. In addition, a file may include any collection of data including data stored on secondary storage such as a disk, CD or primary storage such as RAM or cache memory. A data access determinator determines whether a calling application should be allowed execution privileges by, for example, computing a hash value of the executable file and checking whether this hash value matches the corresponding stored unique application verification data. If there is a match, the application is granted execution privileges.

The application registration data is stored so that an application need not be re-enrolled once it has been approved. In addition, the application registration data may be authenticated by a user's public signing key on a periodic and selectable basis.

In one embodiment, the application registration data is a list of hash values of approved applications. A trusted centralized registration list generator generates the approved application registration data for a plurality of nodes, applications or other communication units. Each relying application unit or computing unit, generates a hash value of a requesting application and evaluates whether the generated hash value matches the centralized registration list.

The application registration data may be pre-generated and signed by a trusted authority to facilitate centralized control and distribution to end users. The application registration list may include, for example, a list of applications so that the centralized authority can dictate only those applications that can be used. This may be desirable, for example, where licensing of applications is important and strict licensure must be maintained. Alternatively, a centralized or noncentralized application registration data list may be customized on a per user basis so that each user has a unique list.

FIG. 1 shows an apparatus 10 for controlling application execution privileges. The apparatus 10 may be a suitably programmed computer, such as an IBM PC, or another suitable processing unit. The apparatus 10 includes an application registration data generator 12, an application registration data verifier 14, that serves as a data access determinator, and an application registration enrollment verifier 16.

The application registration data generator 12 generates application registration data 18 containing at least application identification data, such as the path and name of the calling application and/or other suitable identification data. The application registration data generator 12 also generates corresponding unique application verification data 20 through a data retriever and hash value generator 22. The hash value generator 22 receives calling application data 24. The calling application data 24 includes location data such as data representing a path where the executable file data is located in memory, such as RAM or ROM. However, any suitable data that can be used to identify the application may be used. The system uses the data representing the path to obtain executable file data to compute a hash value of executable file data associated with the calling application. The hash value generator 22, may be any suitable one-way hash function generator or other algorithm that generates a value as a function of the calling application data.

The application registration data generator 12 includes an application registration data provider 26 that receives the unique application verification data 20 and at least a portion of the calling application data 24, such as application identification data and executable file data. The application registration data provider 26 may be a database or other suitable system that suitably links identification data with stored corresponding unique application verification data. The application registration data generator 12 also receives private signing key data 28 to optionally provide signed application registration data.

The application registration data verifier 14 receives the application registration data 18 to determine application execution privilege, based on the application identification data and stored unique application verification data. The application registration data verifier 14 compares the stored unique application verification data from the application registration data 18 with generated unique application verification data 20 to compare computed hash values. If the unique application verification data 20 and the stored unique application verification data obtained from the application registration data 18 match, execution privilege is granted for the calling application. The execution privilege includes, for example, the right for the calling application to execute. However, it will be recognized that any suitable refinement of execution privileges, may be used, for example granting execution only to specified users or specified hardware devices, or during specified time periods.

The application registration data verifier 14 evaluates the calling application data and compares the name in the calling application data with stored calling application name data. If a match is found, the hash value of the calling application is generated using the calling application data as a pointer to the executable file data. The application registration data verifier 14 outputs registration status data 30 and application integrity status data 32 that is used by the application registration enrollment verifier 16. The registration status data 30 is, for example, data representing whether the name and path data (e.g, ID data), of the calling application matches some stored name and path data (application registration list). Application integrity status data 32 is data representing whether or not the computed unique application verification data 20 is the same hash value that is stored as application registration data 18 or if it is a different hash value, indicating perhaps a different version of the program or an unauthorized application. If the registration status data 30 and application integrity status data 32 indicates a match in the names but not a match of the hash values, indicating perhaps a new version of a previously approved application, an output signal is generated to trigger a request for user approval to indicate approval of the calling application. If neither the names nor hash values match, the output signal is generated to trigger a request for user approval. Even if both the name and hash values match, a user may still be asked for approval if approval is needed on a per session basis for example. The application registration enrollment verifier 16 also receives approval data 34 entered by a user (or other application, such as a centralized information security application) to indicate that a particular application has been approved for execution privileges.

Figure 2:
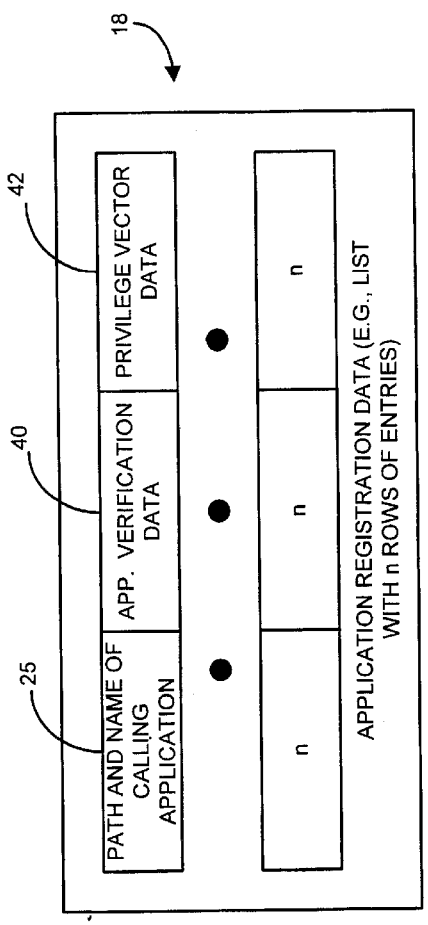
FIG. 2 is a graphic illustration of an embodiment of an application registration list in accordance with one aspect of the invention.

As shown in FIG. 2, the application registration data 18 may include, for example, application identification data 25, stored unique application verification data 40, such as a stored hash value (also referred to as a stored message digest) generated from the executable file corresponding to the application. Other data may also be included, for example, privilege vector data 42 representing specific privileges associated with the particular calling application, or finer constraints on the execution privileges. For example, a calling application may only be allowed to execute at certain times of day, on certain hardwire devices or CPUs, be restricted to running on behalf of specified users or userids, or be constrained to specified privileges or classes thereof such as read/write controls on various file structures or directories or any other additional capabilities or constraints by using constraint data beyond the mere allowance of executability.

The application registration data 18 includes data representing approved applications that are allowed execution privileges. Hence, only authorized applications will have corresponding unique application verification data 40 stored therein. The user's private signing key 28 may optionally be used to digitally sign the application registration data 18 using conventional digital signing techniques, such as generating a hash value of the application registration data and digitally signing the hash value using the private signing key. Alternatively, the digital signature may be performed by a trusted authority that is trusted, for example, through public key certificates by users in the system. Message authentication codes (MACs) as are known in the art, may also optionally be used for integrity.

The hash value generator 22 is used both during the initial generation of accepted applications stored as the application registration data 18 and during operation of the system to continually generate or extract application verification data of calling applications as calling applications seek execution privileges. However, it will be recognized that separate hash value generator may also be used if desired. The hash value generator 22, as previously mentioned, generates the message digest or unique application verification data 20 for a plurality of executable applications by using a hash function and at least executable file data for each calling application. Hence, the unique application verification data 20 is a function of the executable file data.

Using a one-way hash function provides a unique value for each application or version of calling application. Also, it reduces the amount of data stored as registration data. Alternate functions which associate unique values to different applications could be used in place of a one-way hash function. For example, a function which measures the byte size of an application may suffice in some environments. As yet another alternative, the hash value generator 22 may simply be no more than an information retriever which retrieves resource information associated with the calling application, such as application name and resource version number, for use in comparison to the stored unique application verification data 40.

Figure 3A:
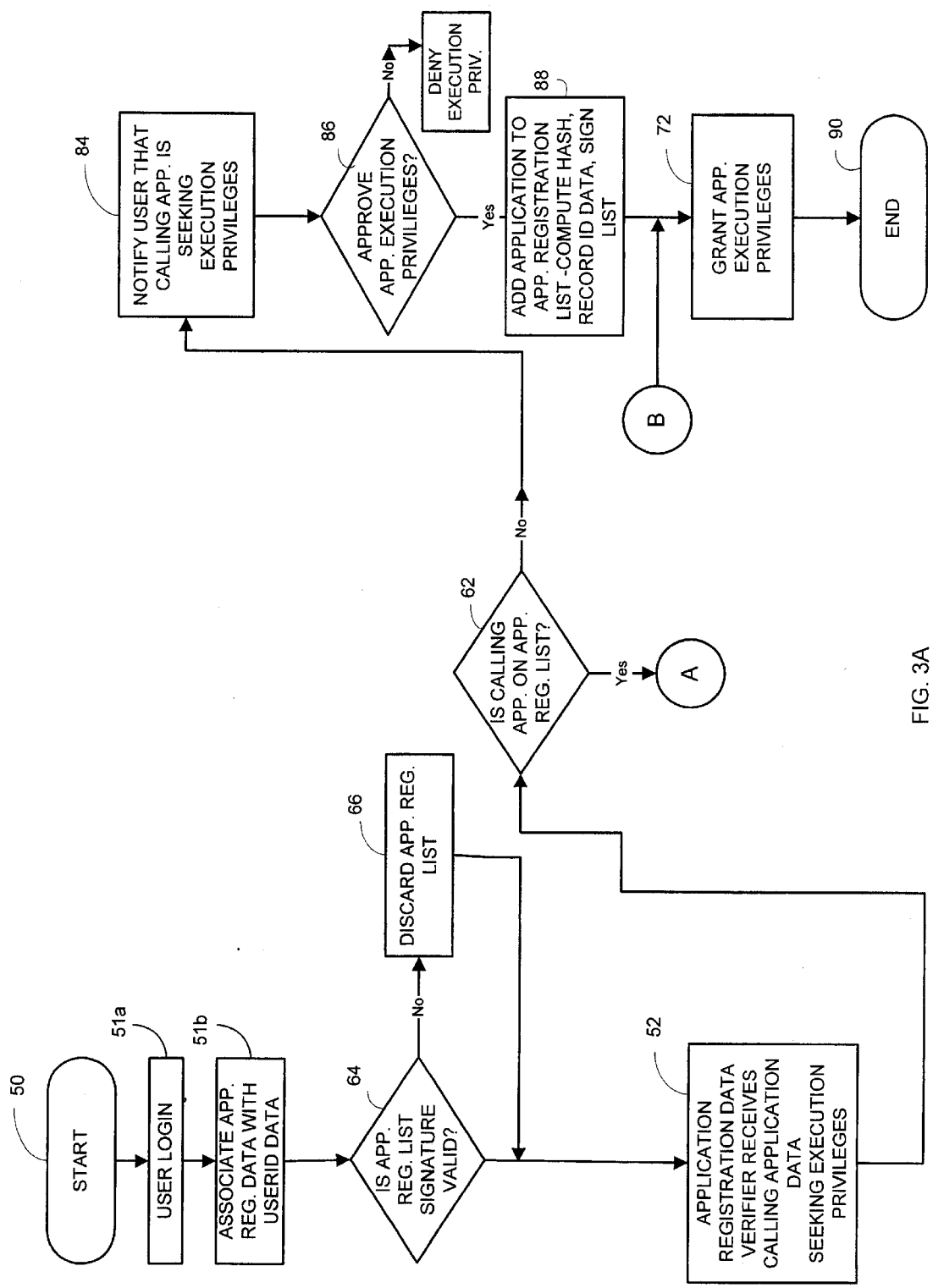
FIG. 3a is a flowchart illustrating an example of one method for controlling application execution privileges in accordance with the invention.

Referring to FIG. 3a, a method of operation of the system shown in FIG. 1 will be described. As shown in block 50, the system starts by initializing the registration data (e.g., list). As shown in block 51a, the user carries out a standard login procedure as is known in the art, and is thereby associated with a userid. As shown in block 51b, the system locates the application registration data associated with this user/userid. Optionally, additional verification occurs. As shown in block 64, the system determines if the application registration data is valid by checking its integrity. For example if it has been signed, this is done by checking whether the digital signature is valid in accordance with conventional public/private key digital signature verification techniques, as known in the art. As shown in block 66, if the digital signature based on the private signing key is not determined to be valid, the system determines the application registration data 18 to be invalid, and discards the registration data. Other mechanisms for providing integrity checking/verification could be used, as will be recognized by one of ordinary skill in the art. The optional verification of the application registration data may occur once at the time a user initially logs in, each time this data is utilized, or at any other convenient frequency.

As shown in block 52, the apparatus then receives calling application data 24 indicating an application seeking execution privileges. The system then determines whether the calling application or the software application requesting execution privileges appears on the registration list (identified in the application registration data 18). This is shown in block 62. This is determined, for example, based on the application identification data stored as part of the application registration data. A comparison is done between the received application identification data and the list of application identification data stored as application registration data. When received application identification data matches an entry within the stored application identification data, the system determines that the current calling application is on the list of approved applications.

The system generates unique application verification data of the calling application as shown in block 68. As shown in block 70, the system compares the computed unique application verification data to the stored unique application verification data in the application registration data 18. If the computed and stored data match, the system grants the application execution privileges as shown in block 72. If the computed unique application verification data does not match the stored unique application verification data, the user is notified that the application is listed in the application registration but may have been upgraded or it is an unauthorized application as indicated in block 74. Hence, although identification data may match indicating that the name of the application is the same, the unique verification registration data indicates that a different calling application is requesting execution privileges. The system then generates a signal (for example, resulting in a prompt to the user) and awaits a response to determine whether approval is desired so that the application can still be granted execution privileges as shown in block 76. If the response signal does not indicate approval, execution privilege is denied as shown in block 78. However, if the signal does approve execution, the system updates the requisite entry in the application registration data with the computed application verification data as shown in block 80. The system then grants execution privileges. In an alternative embodiment, if the compared values do not match, execution privilege is simple denied immediately. As such, the system generates an approval request signal to solicit approval of a calling application, awaits a response and grants or denies execution privileges on the response.

The application registration data may be in the form of a list, table, summary or any other suitable format. If the calling application is not part of the application registration data, the user is notified that the calling application is requesting execution privilege as shown in block 84. The user is then prompted to indicate whether execution privileges should be granted to the application as shown in block 86. This may be done, for example, through a graphic user interface. If the user responds indicating that execution privileges should be granted, the application is then added to the application registration list as shown in block 88. For example, the system computes application verification data by applying a one-way hash algorithm to executable data corresponding to the calling application, and also stores the application identification data (e.g., application name and path) with the computed hash value (message digest) as application registration data in the registration list for example. The registration list may optionally be re-protected for integrity purposes, for example, via a digital signature process as known in the art. Execution privilege is then granted to the application and the process ends as shown in block 90 until another application requests execution privileges. The system may compare a location of the executable file data with the location of approved executable file data indicated by the application registration data in the list.

Accordingly, the very first time that an application seeks execution privileges, the application registration data (or list) is empty or may contain a few default applications, such as the core security management application or core operating system programs. Alternatively, the application registration data may contain a large number of pre-approved applications or other hashes. The user's signature on the original list may be created at the time authorized execution privilege data is created. Alternatively, a default or startup list may be signed by a user's trusted certification authority and the certification authority's signature may be verified assuming the user has a trusted verification signature key of that certification authority.

In an alternative embodiment, when a user is prompted by the system to ask whether to approve an application for execution privileges, the user may not have any way of checking whether the application is a rogue application since looking at path and name data may provide little assurance that the application has not been tampered with. Consequently, the system provides the computed hash value or other application identification data to an output interface, such as a display device and receives a response through an input interface, such as a keyboard touch screen, voice recognition system or other suitable interface. Where the output interface is a display device, the system visually displays the hash code, or some other digital format or graphical representation of the executable file. The user then compares the displayed hash code to a trusted hash code obtained elsewhere, for example, on a list of authentic hash codes published on a company's web site or other list. In yet another alternative embodiment, the user's system automatically seeks and retrieves (for example, using standard web protocols as known in the art, such as HTTP) such a list of authentic hash codes or authorized applications from such a web site. As such, the system includes an output interface that outputs the computed hash value, or other application identification data, and an input interface operative to receive a response indicating whether the computed hash value is part of approved application registration data.

In a preferred embodiment the application registration data is preferably securely stored in a location accessible to software applications. The secure storage may be provided by an integrity protection technique, such as a MAC or digital signature or any other suitable alternative security technique, as known in the art. Other modifications will be evident to those of ordinary skill in the art. For example, the system may prompt a user for approval of an application, not only the very first time an application is invoked, but also the first time that each particular application is invoked within each login session. The user may "click a button" approving access by the application instead of having to reenter a password.

Figure 4:
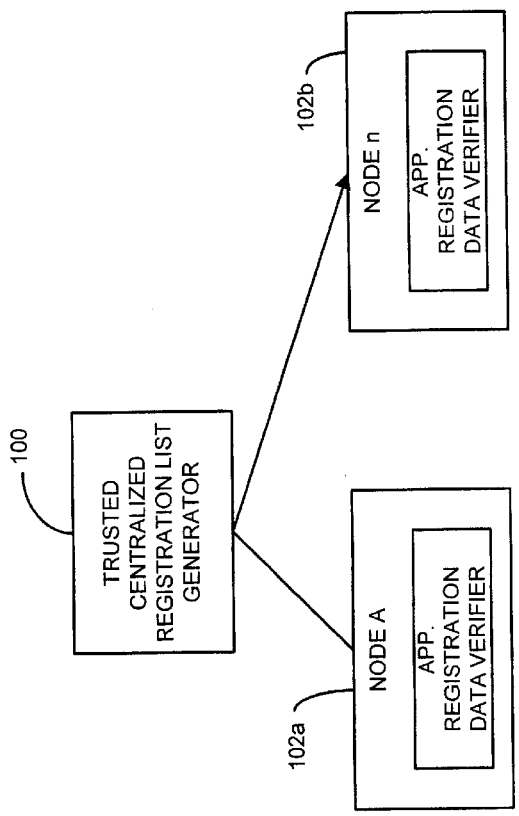
FIG. 4 is a block diagram illustrating a centralized application registration list generator that sends application registration data to nodes which then verify application authorization in accordance with one embodiment of the invention.

Referring to FIG. 4, an alternative embodiment including a trusted centralized registration list generator 100 is in operative communication with a plurality of nodes 102a and 102b. The nodes 102a and 102b include, for example, the apparatus 10 except that the application registration data is centrally stored in the trusted centralized registration list generator 100 and not in memory of the nodes. Each node 102a and 102b includes an application registration data verifier, such as application registration data verifier 14 in FIG. 1. The verifiers compare a computed hash value to the stored hash value in the message digest obtained from the trusted centralized registration list generator on a per application basis when an application calls. Alternatively, the centralized registration list may be downloaded once to each node and stored locally and the node then operates as previously described with reference to FIG. 1 and FIGS. 3a–3b except that the application registration data that is stored is not updated by the node since only the trusted centralized list generator may modify the application registration data. The trusted centralized registration list generator 100 is trusted in the sense that the list is digitally signed by the centralized registration list generator and sends the list with a public key certificate of the generator 100. In an alternative embodiment, the list is not digitally signed, but rather obtained from the trusted centralized list generator 100 over an alternate secured channel, such as a secure session based on a session protocol such as SSL or TLS as is known in the art. The centralized registration list may be updated periodically and periodically downloaded to provide updates.

If desired, the disclosed system can require the user to approve the granting of execution privileges for an application each time the application requests it, since the application automatically evaluates whether or not the application appears on an approval list. Also, applications running in background where the user may not be aware of their operation are still prevented from gaining execution privileges if they do not appear on the list or have not been approved at some point by a user.

The above system may be implemented as software or a combination of hardware and software. Therefore, a storage medium such as a CD ROM, DVD or other suitable storage device may include memory locations containing data representing executable instructions that cause a processing device to perform the above described operations. For example, the executable instruction may generate application registration data containing at least application identification data and corresponding unique application verification data wherein the unique application verification data is based on executable file data; and memory locations containing data representing executable instructions that cause a processing device to determine application execution privileges, based on the application identification data and the unique application verification data, and the other operations as described herein.

Figure 3B:
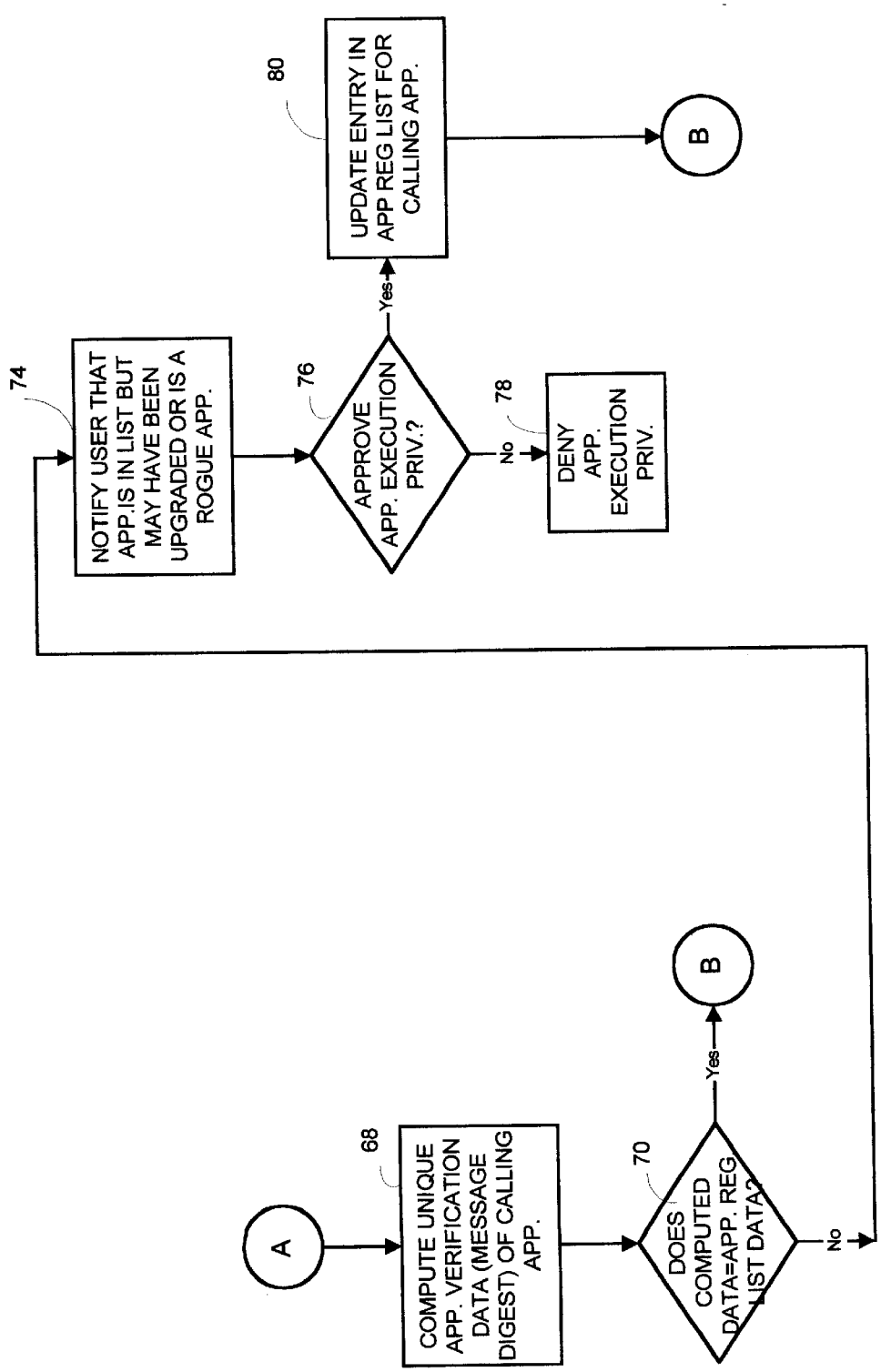
FIG. 3b is a flowchart depicting one example of a method for controlling application execution privileges in accordance with the invention.
Figure 5:
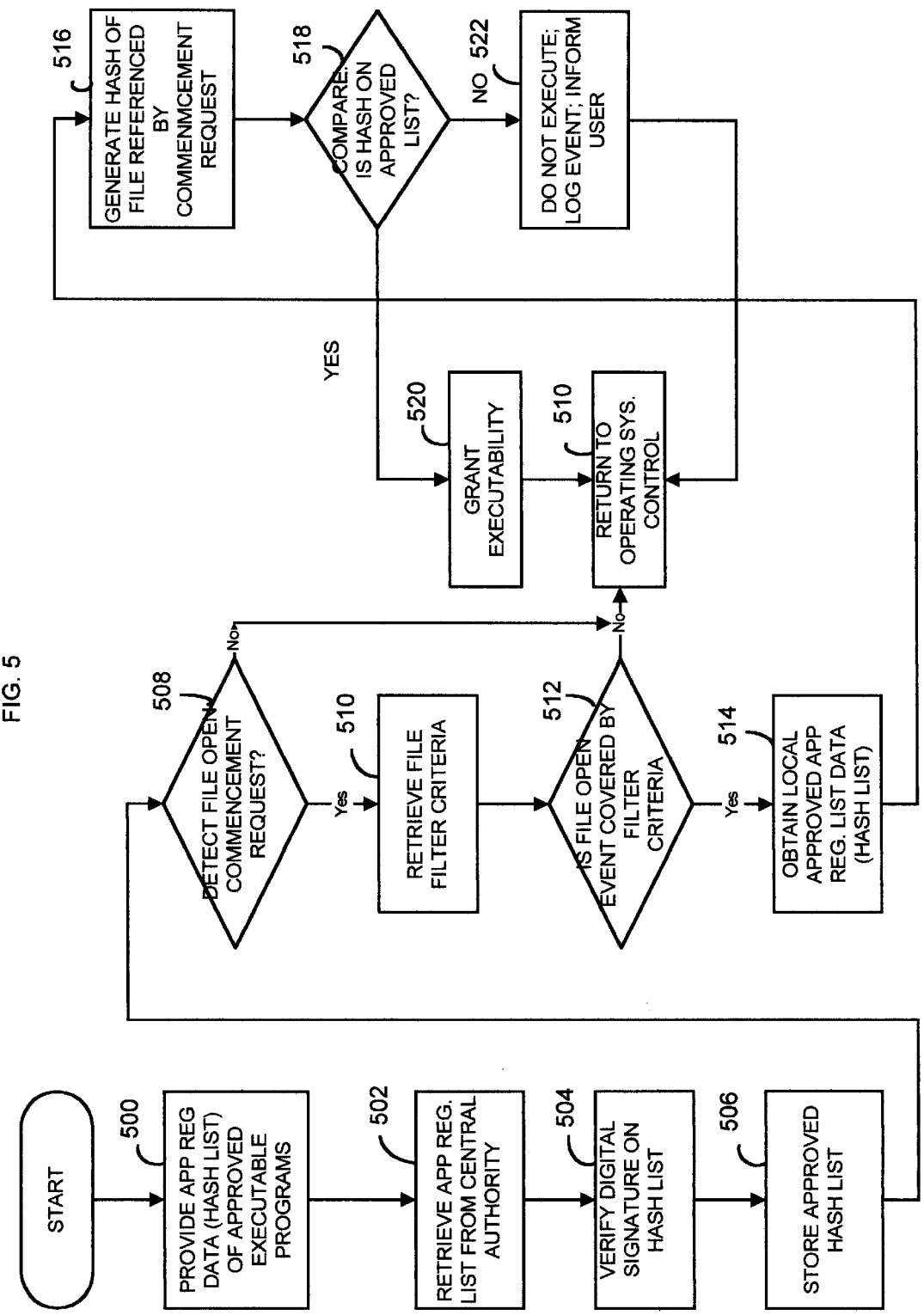
FIG. 5 is a flowchart illustrating an alternative embodiment of a method for controlling program execution in accordance with one embodiment of the invention.

Referring to FIGS. 1, 4 and 5, FIG. 5 illustrates an alternative embodiment to that shown in FIGS. 3a and 3b. As shown, the application registration data provider 26 containing a plurality of hash values such as a pre-approved list of hash values corresponding to executable programs approved for execution by the trusted centralized registration list generator 100, provides the application registration data as shown in block 500. As used herein, unique application verification data elements correspond to, for example, hash values or values resulting as uniquely associatable data, such as a function of executable file data. Alternatively they may also refer to uniquely associatable values which can reliably (for example with high probability) be uniquely associated with executable file data. A first-party processing unit 102a retrieves the application registration list from the central authority as shown in block 502. This retrieval may be in the form of retrieving a certificate that has been signed by the trusted central authority using the central authority's public key as well-known in public key cryptography systems. Preferably, each of the hash values in the application registration list is generated from the entire executable program resulting in a unique fixed length data string.

As an alternative to unit 102a retrieving the application registration list from the central authority, the central authority may publish this data in a separate location such as a directory, repository or database from which unit 102a then retrieves it. Yet another alternative is for the central authority to cause the application registration list to be transferred to unit 102a in the absence of unit 102a initiating the request, for example by store and forward means such as e-mail, or using "push technology" as is known in the art.

As shown in block 504, the node or receiving processor verifies the integrity (for example, using standard digital signature techniques as known in the art) of the hash list. The receiving processor then stores the approved hash list as shown in block 506. As shown in block 508, the receiving processor (node) detects a file open commencement request, or file open event using a hook or other suitable mechanism to detect whether an executable file or executable data is attempting to execute within the operating system of the receiving processor. This detection is preferably done on a continuous basis so that no executable file is allowed to execute without being analyzed. However, this may also be done on a periodic basis. For example, it may be desirable to provide detection on a monthly basis to insure, for example, that software being run is licensed. If no file open commencement request is detected, the system returns to operating system control as shown in block 510. However, if an executable file open commencement request is detected, the processor retrieves file filter criteria as shown in block 510. File filter criteria may include, for example, any suitable data identifying whether or not the file or executable file data designated for execution (and, hence, generating the open commencement request) is such a file that should be analyzed for being on the hash list. For example, file filter criteria may include the extension of files believed to be executable such as exe, java, or any other suitable executable file delineator. Other filter criteria may include where the file is located, for example in which local directory, at what memory address range, or on which disk partition. This may allow core applications or operating system applications (which may be known to be stable, trustworthy, licensed, or pre-approved), to bypass the checking procedure and be granted default execution privileges immediately.

As shown in block 512, if the file open event or open commencement request associated with the designated program for execution is listed in the file criteria, the processor obtains a copy of the stored approved hash list that was stored locally as shown in block 514. As shown in block 516, the node uses its hash value generator to generate a hash of the program designated for execution (e.g., the file referenced by the commencement request) and compares the generated hash value with the stored hash values on the approved hash list. This is shown in block 518. If the generated hash value appears on the approved hash list, the processor grants executability to the program designated for execution as shown in block 520. This process is done on a continuous basis each time an application is designated for execution. As such, the process may occur in fore ground or background operation and prevents an executable program from being run if it does not appear on the approved hash list. As shown in block 522, if the hash value generated by the receiving processor does not match the hash value on the approved hash list, the system prevents the executable file data from executing and may optionally record the non-approval condition based on the comparison, log the event and/or inform the user. As such, prior to allowing individual program execution by the receiving processor, the receiving processor generates the second unique application verification data element or hash value as a function of executable file data corresponding to a program designated for execution. The processor then compares at least one of the plurality of hash values or first unique application verification data elements in the approved hash list to the unique application verification data element generated by the receiving processor. The receiving processor will then grant program executability on a pre-program basis based on the comparison of the first and second unique application verification data elements.

Figure 6:
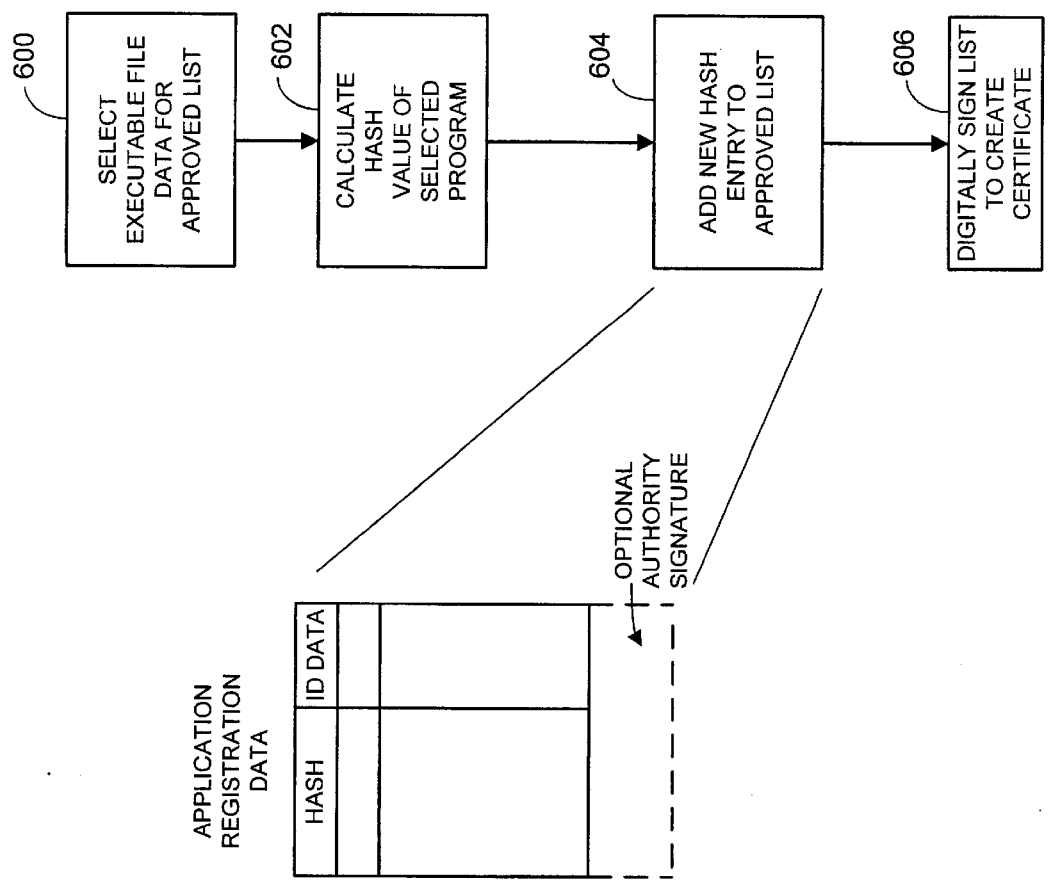
FIG. 6 is a flowchart illustrating the operation of a centralized hash list distributor in accordance with one embodiment to the invention.

Also referring to FIGS. 4 and 6, the trusted authority generates the plurality of unique application verification data elements, for example the approved hash list, for a plurality of receiving processors or nodes. As such, the trusted authority provides centralized distribution of the plurality of unique application verification data elements to a plurality of receiving processors. The information may be periodically updated and the receiving processors may obtain the updated data periodically, for example, each time a user logs in or at predefined intervals. Each of the receiving processors or nodes generates their own unique application verification data element or hash value and compares the self-generated value to unique application verification data elements provided by the centralized central trusted authority.

As shown in block 600, the trusted authority selects the candidate programs that, for example, are to be passed through a hash function and made part of the approved hash list. The central authority may obtain this information by entry through a graphic user interface by a system administrator or may have the information automatically downloaded from another source. The trusted authority then calculates the hash value, or other unique application verification data element, of each of these selected programs, as shown in block 602, to generate the pre-approved hash list. This application registration data as previously noted, may also include alternate data or other identification data if desired. For example, along with the hash value which is a unique identifier of the executable program for all programs in the list, identification data may be generated indicating the nodes that are allowed to run the programs listed in the approved hash list or the specific version of program whose hash has been generated. The additional identification data may also indicate, for example, whether a new version of the program has been released so that upon detection of the program for execution by the receiving unit, the receiving unit may then detect, by pulling up the corresponding hash, the added identification data noting that a new version is available. As such, dual hash lists (see FIG. 7) may also be used to facilitate distribution of updated versions of software. The attempted program execution facilitates an automated software upgrade process. For example, the program attempting to execute is upgraded by automatically downloading a new version. The system stores data representing an updated version of the program designated for execution, such as a stored hash of the upgrade, and also stores data indicating that an upgrade for the program designated for execution is available, such as upgrade identification data. Execution of the new version is allowed based on a comparison of the stored hash of the upgrade which appears in the application upgrade installation list, to a computed hash of the upgraded version of software without requiring explicit user approval of the upgraded version. As such, the identification data may include data representing the need or opportunity to update to a new version, as well as optional location information such as an address of URL from which the updated version may be downloaded. As shown in block 604, after the central authority calculates the hash function or other application verification data for a selected program, it adds the new hash entry to the hash list.

Figure 7:
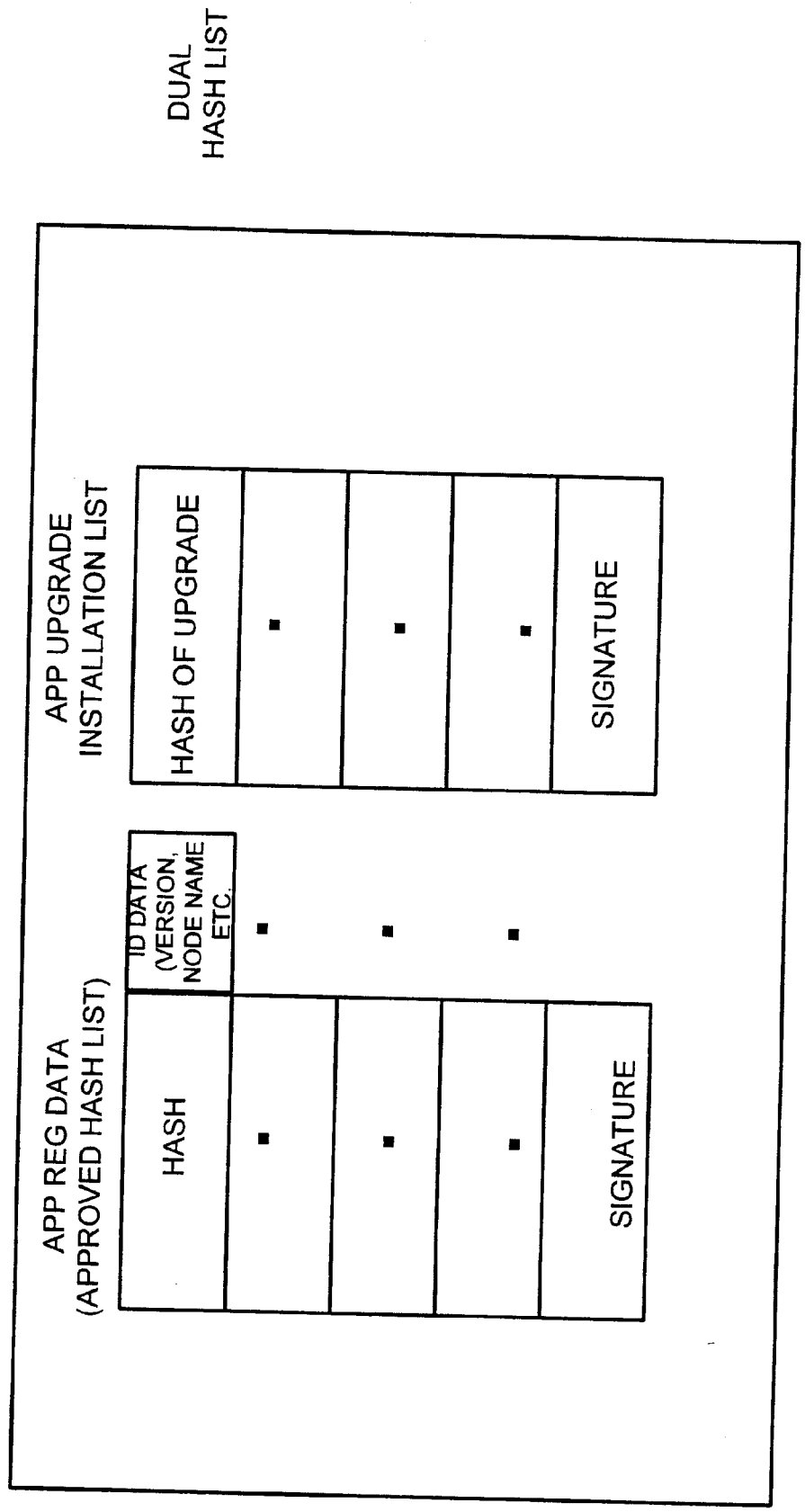
FIG. 7 is a graphic representation of a dual hash list embodiment in accordance with one embodiment of the invention.

As shown in FIG. 7, the registration application list stored by the central authority in a suitable repository, may include version update data as identification data as previously noted. In addition, other identification data may be attached to the hash value to speed up the look-up operation by the receiving unit. For example, the entire approved hash list is distributed to each receiving unit, but a particular receiving unit is only allowed to run a subset of programs identified on the hash list, an identifier of the recipient may be attached to a hash value or set of hash values indicating that they are approved for a given recipient or class of recipients.

As indicated with respect to FIG. 5, the receiving unit continuously detects a file commencement request so each time the application is started it is evaluated to determine whether or not the calling application is approved. The receiving unit retrieves the file filter criteria from local storage, from remote storage such as a remote repository, or from any other appropriate source such as a trusted central authority. The receiving unit then determines whether commencement request is for a file approved from the filter criteria prior to performing the comparison of hash values. If desired, the receiving processor also records the non-approval condition of the application based on the comparison of the unique application verification data elements.

Referring again to FIG. 6 and FIG. 7, the trusted authority may store program update trigger data associated with one or more of the unique application verification data elements so that a receiving unit may be prompted or triggered to request an updated version of the software from the central authority or other source based on the approved hash list. In a preferred embodiment, the updated version may be acquired without explicit action on behalf of the human user at the receiving unit.

In one embodiment of the disclosed system, a matching of hash values (based on the entire executable file) from a list of approved hash values results in the calling application being granted access to execute. The hash value comparison is done on a continuous basis, each time the application is called to run. In this way, an on-going security check is done based on the entire executable file each time the application seeks to start running on the system.

Also, the systems may be a plurality of programmable processing units. As such, a suitable storage medium, including a file on a networked system, CD ROM or other storage medium may contain memory containing executable program instructions that when executed by a processing unit causes the processing unit to carry out the above described functions.

It should be understood that the implementation of other variations and modifications of the invention in its various aspects will be apparent to those of ordinary skill in the art, and that the invention is not limited by the specific embodiments described. For example, the term application can include libraries, groups of applications or any suitable execution mechanisms that cause (directly or indirectly) executable code to run. Program execution may refer to an originally invoked executable program, as well as executable code which is subsequently invoked by such a program (for example, by an operating system "load library" call which may invoke other dynamically linked libraries). While the invention as described relates to program execution privileges, it is also intended to cover related activities such as program installation. It is therefore contemplated to cover by the present invention, any and all modifications, variations, or equivalents that fall within the spirit and scope of the basic underlying principles disclosed and claimed herein.

What is claimed is:

1. A method for controlling program execution for a first party comprising the steps of:

providing application registration data, by a second party, containing a plurality of first unique application verification data elements wherein each unique application verification data element corresponds to at least one of a plurality of approved executable programs and is determined as uniquely associatable data;

prior to allowing individual program execution by the first party, generating by the first party, a second unique application verification data element as uniquely associatable data corresponding to a program designated for execution;

requesting the plurality of first unique application verification data elements for use by the first party, and providing a subset of the plurality of first unique application verification data elements based on application registration identification data;

comparing at least one of the plurality of first unique application verification data elements to the second unique application verification data element; and granting program executability on a per program basis, based on the comparison of the first and second unique application verification data elements.

2. The method of claim 1 wherein the uniquely associatable data is a function of executable file data for each corresponding executable program from the plurality of executable programs.

3. The method of claim 2 wherein the uniquely associatable data includes data representing a hash of an entire program designated for execution.

4. The method of claim 3 including the steps of:

generating the application registration data, by the second party, containing a plurality of first unique application verification data elements by calculating a hash value of approved executable programs using a one way deterministic hash function; and storing the hash values as a plurality of first unique application verification data elements approved for distribution to the plurality of receiving processors as application registration data.

5. The method of claim 1 including the step of generating the plurality of first unique application verification data elements for a plurality of receiving processors.

6. The method of claim 1 including providing centralized distribution of the plurality of first unique application verification data elements to a plurality of receiving processors wherein each receiving processor prior to allowing individual program execution by the receiving processor, generates the second unique application verification data element as uniquely associatable data corresponding to a program designated for execution and compares at least one of the plurality of first unique application verification data elements to the second unique application verification data element.

7. The method of claim 1 including the steps of:

receiving the plurality of first unique application verification data elements;

storing the plurality of first unique application verification data elements;

at least periodically detecting a file commencement request;

retrieving file filter criteria; and determining whether the file commencement request is for a file approved from filter criteria prior to performing the step of comparing.

8. The method of claim 1 including the step of recording non-approval conditions based on the comparison of the at least one of the plurality of first unique application verification data elements with the generated second unique application verification data element.

9. The method of claim 1 including the step of storing update trigger data associated with at least one of the plurality of first unique application verification data elements.

10. The method of claim 1 including the step of storing at least one of: data representing an updated version of the program designated for execution and data indicating that an upgrade for the program designated for execution is available.

11. The method of claim 1 including the step of analyzing execution privilege data if program executability is granted.

12. A method for controlling program execution for a first party comprising the steps of:
   providing application registration data, by a second party, containing a plurality of first unique application verification data elements wherein each unique application verification data element corresponds to at least one of a plurality of approved executable programs and is determined as uniquely associatable data;
   generating the plurality of first unique application verification data elements by calculating a hash value of approved executable programs;
   storing the hash values as a list of hash values approved for distribution to the plurality of receiving processors as application registration data;
   signing the list of hash values by a trusted authority;
   on a per commencement request basis and prior to allowing individual program execution by the first party, generating by the first party, a second unique application verification data element as uniquely associatable data corresponding to a program designated for execution;
   comparing at least one of the plurality of first unique application verification data elements to the second unique application verification data element; and
   granting program executability on a per program basis, based on the comparison of the first and second unique application verification data elements.

13. The method of claim 12 wherein the uniquely associatable data is a function of executable file data for each corresponding executable program from the plurality of executable programs.

14. The method of claim 13 wherein the uniquely associatable data includes data representing a hash of an entire program designated for execution.

15. The method of claim 12 including the step of generating the plurality of first unique application verification data elements for a plurality of receiving processors.

16. The method of claim 12 including providing centralized distribution of the plurality of first unique application verification data elements to a plurality of receiving processors wherein each receiving processor prior to allowing individual program execution by the receiving processor, generates the second unique application verification data element as uniquely associatable data corresponding to a program designated for execution and compares at least one of the plurality of first unique application verification data elements to the second unique application verification data element.

17. The method of claim 12 including the steps of:
   receiving the plurality of first unique application verification data elements;
   storing the plurality of first unique application verification data elements;
   at least periodically detecting a file commencement request;
   retrieving file filter criteria; and
   determining whether the file commencement request is for a file approved from filter criteria prior to performing the step of comparing.

18. The method of claim 17 including the step of recording non-approval conditions based on the comparison of the at least one of the plurality of first unique application verification data elements with the generated second unique application verification data element.

19. The method of claim 12 including the step of storing program update trigger data associated with at least one of the plurality of first unique application verification data elements.

20. The method of claim 12 storing at least one of: data representing an updated version of the program designated for execution and data indicating that an upgrade for the program designated for execution is available.

21. The method of claim 12 including requesting the plurality of first unique application verification data elements for use by the first party, and providing a subset of the plurality of first unique application verification data elements based on application registration identification data.

22. The method of claim 12 including the step of analyzing execution privilege data if program executability is granted.

23. An apparatus for controlling program execution for a first party comprising:
   an application registration data generator providing application registration data containing a plurality of first unique application verification data elements wherein each unique application verification data element corresponds to at least one of a plurality of approved executable programs and is determined as uniquely associatable data;
   a processing unit that, prior to allowing individual program execution by the first party, generates a second unique application verification data element as uniquely associatable data corresponding to a program designated for execution, compares at least one of the plurality of first unique application verification data elements to the second unique application verification data element; grants program executability on a per program basis, based on the comparison of the first and second unique application verification data elements;
   the processing unit receives the plurality of first unique application verification data elements; stores the plurality of first unique application verification data elements; at least periodically detects a file commencement request; retrieves file filter criteria; and determines whether the file commencement request is for file approved from filter criteria.

24. The apparatus of claim 23 wherein the uniquely associatable data is generated as a function of executable file data for each corresponding executable program from the plurality of executable programs.

25. The apparatus of claim 24 wherein the uniquely associatable data includes data representing a hash value based on an entire program designated for execution.

26. The apparatus of claim 23 wherein the application registration data generator generates the plurality of first unique application verification data elements for a plurality of receiving processors.

27. The apparatus of claim 26 wherein the application registration data generator generates the application registration data containing the plurality of first unique application verification data elements by calculating a hash value of approved executable programs using a one way deterministic hash function; and stores the hash values as plurality of first unique application verification data elements approved for distribution to the plurality of receiving processors as application registration data.

28. The apparatus of claim 23 including a centralized distributor of the plurality of first unique application verification data elements to a plurality of receiving processors wherein each receiving processor prior to allowing individual program execution by the receiving processor, generates the second unique application verification data element as uniquely associatable data corresponding to a program designated for execution and compares at least one of the plurality of first unique application verification data elements to the second unique application verification data element.

29. The apparatus of claim 23 wherein the processing unit records non-approval conditions based on the comparison of the at least one of the plurality of first unique application verification data elements with the generated second unique application verification data element.

30. The apparatus of claim 23 including memory containing program update trigger data associated with at least one of the plurality of first unique application verification data elements.

31. A storage medium comprising:
memory containing executable program instructions that when executed by a processing unit causes the processing unit to provide application registration data, by a second party, containing a plurality of first unique application verification data elements wherein each unique application verification data element corresponds to at least one of a plurality of approved executable programs and is determined as uniquely associatable data;
memory containing executable program instructions that when executed by a processing unit causes the processing unit to, prior to allowing individual program execution by a first party, generating a second unique application verification data element as uniquely associatable data corresponding to a program designated for execution; comparing at least one of the plurality of first unique application verification data elements to the second unique application verification data element; granting program executability on a per program basis, based on the comparison of the first and second unique application verification data elements;
memory containing executable program instructions that when executed by a processing unit causes the processing unit to receive the plurality of first unique application verification data elements; store the plurality of first unique application verification data elements; at least periodically detect a file commencement request; retrieve file filter criteria; and determine whether the file commencement request is for a file approved from filter criteria prior to performing the step of comparing.

32. The storage medium of claim 31 including memory containing executable program instructions that when executed by a processing unit causes the processing unit to generate the uniquely associatable data is a function of executable file data for each corresponding executable program from the plurality of executable programs. The storage medium of claim 31 including memory containing executable program instructions that when executed by a processing unit causes the processing unit to generate the uniquely associatable data is a function of executable file data for each corresponding executable program from the plurality of executable programs.

33. The storage medium of claim 31 including memory containing executable program instructions that when executed by a processing unit causes the processing unit to provide centralized distribution of the plurality of first unique application verification data elements to a plurality of receiving processors wherein each receiving processor prior to allowing individual program execution by the receiving processor, generates the second unique application verification data element as uniquely associatable data corresponding to a program designated for execution and compares at least one of the plurality of first unique application verification data elements to the second unique application verification data element.

34. The storage medium of claim 31 including memory containing executable program instructions that when executed by a processing unit causes the processing unit to generate the application registration data containing a plurality of first unique application verification data elements by calculating a hash value of approved executable programs using a one way deterministic hash function; and to store the hash values as plurality of first unique application verification data elements approved for distribution to the plurality of receiving processors as application registration data.

35. A method for controlling program execution for a first party comprising the steps of:
storing at least one of: data representing an updated version of the program designated for execution and data indicating that an upgrade for the program designated for execution is available;
providing application registration data, by a second party, containing a plurality of first unique application verification data elements wherein each unique application verification data element corresponds to at least one of a plurality of approved executable programs and is determined as uniquely associatable data;
prior to allowing individual program execution by the first party, generating by the first party, a second unique application verification data element as uniquely associatable data corresponding to a program designated for execution;
requesting the plurality of first unique application verification data elements for use by the first party, and providing a subset of the plurality of first unique application verification data elements based on application registration identification data;
comparing at least one of the plurality of first unique application verification data elements to the second unique application verification data element; and
granting program executability on a per program basis, based on the comparison of the first and second unique application verification data elements.

* * * * *